March 13, 1956
E. A. SCHRAMM
2,738,465
EQUALIZER
Filed May 5, 1951
FIG. 1
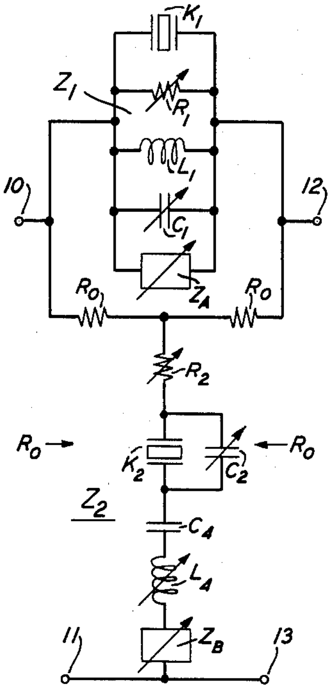
FIG. 2
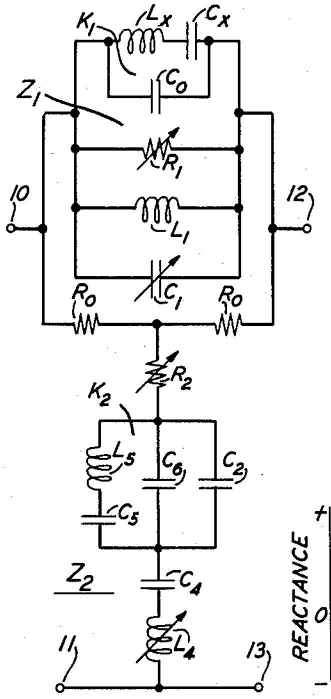
FIG. 3
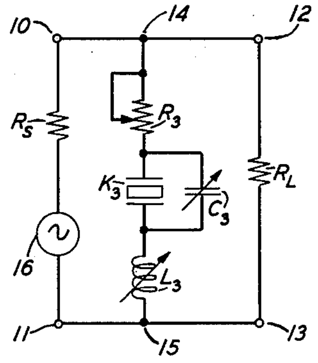
FIG. 4
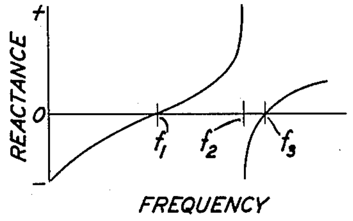
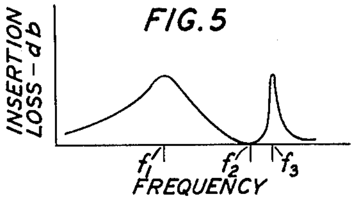
FIG. 6
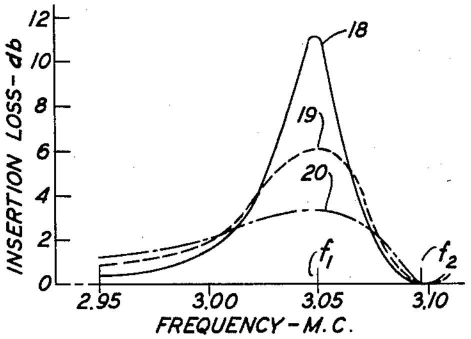
FIG. 7
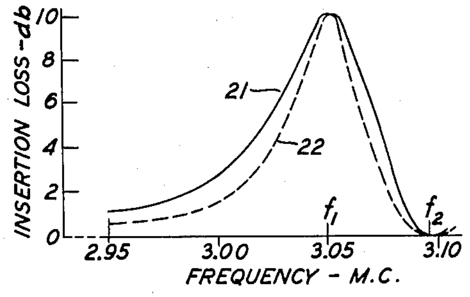
FIG. 8
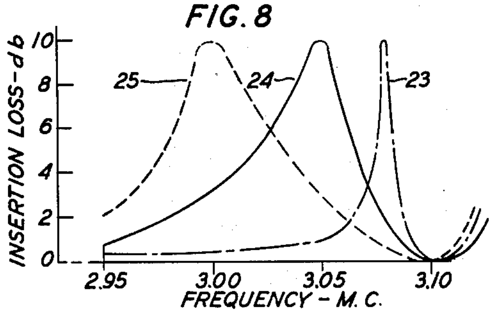
INVENTOR
E. A. SCHRAMM
BY Ralph T. Holcomb
ATTORNEY 2,738,465
Patented Mar. 13, 1956

2,738,465

EQUALIZER

Elmer A. Schramm, Warren Township, Somerset County, N. J., assignor to Bell Telephone Laboratories, Incorporated, New York, N. Y., a corporation of New York Application May 5, 1951, Serial No. 224,763

5 Claims. (Cl. 333—28)

This invention relates to wave transmission networks and more particularly to equalizers.

The object of the invention is to introduce a peak of loss which can be independently adjusted in height, sharpness, and frequency, while the loss at another selected frequency remains substantially zero.

If sufficiently long, telephone and television circuits of the type employing coaxial lines, even though equipped with basic equalizers under the automatic control of a pilot frequency, often show gain distortion in the form of a comparatively sharp peak, which may reach a height of as much as 10 decibels or more, located in the neighborhood of the pilot frequency. Equalizers heretofore available for removing such a peak have the serious shortcoming that they introduce a loss of between 1.5 and 3 or more decibels at the pilot frequency, thus greatly reducing the effectiveness of the automatic gain regulation provided for the system.

The equalizer in accordance with the present invention reduces the loss at the pilot frequency to substantially zero by employing a shunt impedance branch which includes the series combination of a resistor, an inductor, and a piezoelectric crystal which is parallel resonant at or near the pilot frequency. The equalizer will have peaks of loss at the resonant frequencies of the shunt branch. Means may be provided for adjusting the resistance of the resistor, in order to vary the heights of these peaks, and the inductor may be made adjustable for shifting the frequencies at which the peaks occur. The lower peak becomes broader as it is moved farther from the parallel-resonant frequency of the crystal. However, the sharpness of the peak may be adjusted by adding an adjustable capacitor in shunt with the crystal. If the product of the inductance and the capacitance is kept constant, the sharpness of the peak may be adjusted, without changing its height or frequency, by adjusting both the inductor and capacitor. Also, the peak may be shifted in frequency by adjusting only the capacitor, if a change in sharpness is permissible. It is apparent that a great variety of shapes, heights, and frequency locations of the loss peaks may thus be provided by the equalizer. However, for all settings of the adjustable elements, the loss of the equalizer is substantially zero at the parallel-resonant frequency of the crystal, because at this frequency the equalizer presents a very high shunt impedance to the transmission line with which it is associated. One or more additional impeders, either resistors, inductors, or capacitors, may be added in series or in shunt with one or more of the elements already mentioned to provide special shapes of the loss peak, if desired.

If a constant-resistance image impedance is required for the equalizer, it may be constructed as a bridged-T network comprising two equal resistors connected in series, a shunt branch of the type described above connected to the common terminal of the resistors, and a bridging branch, which also includes a piezoelectric crystal, having an impedance inverse to that of the shunt branch, connected between the outer terminals of the resistors. In many cases it is found that one of the crystals is not physically realizable. However, in accordance with a design technic herein presented, involving the addition of one or more redundant capacitors to one of the branches, both crystals can always be realized physically. As a special case, it is shown how to design the equalizer to use identical crystals in both the bridging branch and the shunt branch. A resulting advantage is that one of the branches can be designed to use an available standard crystal, and the same type of crystal can be used also in the other branch, thus often avoiding the design of a special crystal. The manufacture of the equalizer is thus simplified and the cost reduced.

The nature of the invention will be more fully understood from the following detailed description and by reference to the accompanying drawings, of which:

Fig. 1 is a schematic circuit of one embodiment of an equalizer in accordance with the invention, in the form of a bridged-T network;

Fig. 2 is an equivalent circuit of a network of the type shown in Fig. 1;

Fig. 3 shows a simplified equalizer in accordance with the invention, connected between a source and a load;

Figs. 4 and 5 show, respectively, typical reactance-frequency and insertion loss-frequency characteristics for the equalizer of Fig. 3; and Figs. 6, 7, and 8 show a variety of other possible insertion loss-frequency characteristics of the equalizer, obtainable by adjusting one or more of the component impeders.

The equalizer in accordance with the invention shown in Fig. 1 is a bridged-T network comprising a pair of input terminals 10, 11, upon which are impressed the alternating current signals to be equalized, and a pair of output terminals 12, 13, to which a suitable load circuit may be connected. The network is a constant-resistance structure, with an image impedance $R_0$, of the general type disclosed in United States Patent No. 1,606,817, granted to G. H. Stevenson on November 16, 1926. The circuit comprises a pair of series resistors each having a resistance equal to $R_0$, an interposed shunt branch of impedance $Z_2$, and a bridging branch of impedance $Z_1$, so related to $Z_2$ that $$Z_1 Z_2 = R_0^2 \qquad (1)$$

The branch $Z_1$ comprises the parallel combination of a piezoelectric crystal $K_1$, a resistor having a resistance $R_1$, an inductor of inductance $L_1$, and a capacitor of capacitance $C_1$. The branch $Z_2$ consists of the series combination of a resistor having a resistance $R_2$, a piezoelectric crystal $K_2$, a capacitor having a capacitance $C_4$, and an inductor of inductance $L_4$, with a capacitor of capacitance $C_2$ shunted across the crystal $K_2$. Additional general impedances comprising any desired combination of resistance, inductance, and capacitance may be connected in series or in shunt with any of the elements in the bridging branch or the shunt branch already described. For example, as shown, a general impedance $Z_A$ may be connected in shunt in the bridging branch $Z_1$ and a second general impedance $Z_B$ in series in the shunt branch $Z_2$. The equalizer will introduce substantially zero insertion loss at the series-resonant frequency of the crystal $K_1$. The other elements, $R_1$, $L_1$, $C_1$, and $Z_A$, in the bridging branch are designed to give the desired loss characteristic at other frequencies of interest.

How to find the required values of the component elements in the shunt branch $Z_2$ may be explained more easily by referring to the circuit shown in Fig. 2, which is equivalent to Fig. 1 if the impedance $Z_A$ is infinite and the impedance $Z_B$ is zero. The crystal $K_1$ has been replaced by its equivalent circuit comprising a capacitance $C_0$, representing the interelectrode capacitance, shunted by the series combination of an inductance $L_x$ and a second capacitance $C_x$. In like manner, the crystal $K_2$ has been replaced by the inductance $L_5$ and the capacitances $C_5$ and $C_6$.

Assuming that the capacitance $C_2$ is zero, or an open circuit, and the capacitance $C_4$ is infinite, or a short circuit, the elements in the shunt branch $Z_2$ will have the following values, in terms of the image impedance $R_0$ and the known values of the elements in the bridging branch $Z_1$:

$$R_2=\frac{R_0^2}{R_1} \quad (2)$$

$$L_4=R_0^2(C_1+C_0) \quad (3)$$

$$L_5=R_0^2C_x(1+L_x/L_1)^2 \quad (4)$$

$$C_5=\frac{L_1}{R_0^2(1+L_x/L_1)} \quad (5)$$

$$C_6=\frac{L_x}{R_0^2(1+L_x/L_1)} \quad (6)$$

As indicated by the arrows, certain of the elements may be made adjustable for changing the insertion loss characteristic of the equalizer. For example, means may be provided for adjusting $R_1$, $C_1$, $Z_A$, $R_2$, $C_2$, $L_4$, and $Z_B$. The height of a loss peak may be changed, without altering the image impedance $R_0$, by adjusting both $R_1$ and $R_2$ while maintaining the inverse relationship given by Equation 2. Also, the frequency at which the peak occurs may be shifted by adjusting both $C_1$ and $L_4$, and $R_0$ will be unchanged if the relationship given by Equation 3 is maintained.

In some cases, however, no crystal $K_2$ can be found for which the elements $L_5$, $C_5$, and $C_6$ in its equivalent circuit will have the values given, respectively, by Equations 4, 5, and 6. In accordance with the invention this difficulty is overcome by adding a capacitance $C_2$ in shunt with $K_2$ and a capacitance $C_4$ in series with the combination, as shown in Figs. 1 and 2. These capacitances may then be adjusted so that the crystal $K_2$ will always be physically realizable. In particular, if the added capacitances have the following values, the crystal $K_2$ will be identical in all respects with the crystal $K_1$:

$$C_2=\sqrt{\frac{L_xC_x}{R_0}}-C_0 \quad (7)$$

$$C_4=\frac{L_1}{R_0^2\left[1-\frac{L_1}{L_x}\left(\sqrt{\frac{L_x}{R_0^2C_x}}-1\right)\right]} \quad (8)$$

Thus, it is often possible to design the bridging branch $Z_1$ around a standard crystal $K_1$ and use a second identical crystal $K_1$ in the shunt branch $Z_2$, thereby simplifying the manufacture and reducing the cost of the equalizer. The values of $R_2$ and $L_4$, given by Equations 2 and 3, respectively, will remain unchanged.

If it is unnecessary to provide an image impedance which is a constant resistance, the equalizer may take the form of a single shunt impedance branch such as is shown in Fig. 3 between the points 14 and 15. A suitable source 16 of impedance $R_S$ may be connected to the input terminals 10, 11, and a suitable load impedance $R_L$ to the output terminals 12, 13. As shown, by way of example only, the equalizer comprises the series combination of a resistance $R_3$, a piezoelectric crystal $K_3$, and an inductance $L_3$, with a capacitance $C_3$ shunting the crystal.

Fig. 4 shows a typical reactance-frequency characteristic for the equalizer of Fig. 3, with zeros at the frequencies $f_1$ and $f_3$ and a pole at the intermediate frequency $f_2$. Fig. 5 shows a typical insertion loss-frequency characteristic for this equalizer. The loss is substantially zero at the frequency $f_2$, corresponding to the antiresonance of the parallel combination $C_3$, $K_3$, and peaks occur at the resonant frequencies $f_1$ and $f_3$. Any one or all of the elements $R_3$, $C_3$, and $L_3$ may be made adjustable, as indicated by the arrows, to permit changing the loss characteristic.

Typical insertion loss-frequency characteristics obtainable by adjusting the elements $R_3$, $C_3$, and $L_3$ are shown in Figs. 6, 7, and 8. Only the peak of loss occurring at the lower resonant frequency $f_1$ is shown. In the equalizer for which these characteristics were taken, the crystal $K_3$, which is made of quartz, has a series resonance at 3.095 megacycles per second and a parallel resonance at 3.100 megacycles, approximately coinciding with the anti-resonant frequency $f_2$. The resistance $R_3$ is adjustable between zero and 100 ohms, the capacitance $C_3$, between 15 and 45 micromicrofarads, and the inductance $L_3$, between 73 and 95 microhenries. The source impedance $R_S$ and the load impedance $R_L$ are each equal to 75 ohms.

Fig. 6 shows how the height of the lower insertion loss peak, which has its maximum value at the resonant frequency $f_1$, may be varied by adjusting the resistance $R_3$ while holding the elements $C_3$ and $L_3$ constant. The solid-line curve 18 corresponds to the minimum value of $R_3$, the curve 20, to the maximum value of 100 ohms, and the curve 19, to an intermediate value. Although not shown in Fig. 6, the upper insertion loss peak, which occurs at the resonant frequency $f_3$, will respond in a similar manner to an adjustment of the resistance $R_3$. It will be noted that the loss at the frequency $f_2$ remains substantially zero for all settings of $R_3$.

Fig. 7 shows how the sharpness of the loss peak at the frequency $f_1$ may be changed by adjusting both $L_3$ and $C_3$ while keeping their product, and also $R_3$, constant. The broader peak 21 corresponds to a small value of $L_3$ and a large value of $C_3$, while the narrower peak 22 corresponds to the reverse condition. Here, also, the loss at the frequency $f_2$ remains substantially zero.

Fig. 8 shows how the lower peak may be shifted in frequency by adjusting $C_3$ while keeping $R_3$ and $L_3$ fixed. The curve 23 corresponds to a small value of $C_3$, the curve 24, to a larger value, and the curve 25, to a still larger value. The frequency $f_1$ at which this loss peak occurs is thus lowered as $C_3$ is increased. At the same time, the antiresonant frequency $f_2$ is lowered only slightly since it cannot fall below 3.095 megacycles, the series-resonant frequency of $K_3$, regardless of how large $C_3$ becomes. Therefore, the frequency of substantially zero loss remains essentially constant as $C_3$ is varied. A similar family of curves may be obtained by adjusting $L_3$ while keeping $C_3$ and $R_3$ fixed. The frequency $f_1$ of the peak will decrease as $L_3$ is increased, but the frequency $f_2$ will not change, and the loss at $f_2$ will remain substantially zero. Of course, both $C_3$ and $L_3$ may be increased to lower the frequency of the peak loss, or both may be decreased to raise its frequency. It is seen that the peak becomes broader as its frequency is lowered. Its sharpness may be adjusted as desired, however, by adjusting both $L_3$ and $C_3$ while keeping their product constant, as explained above in the discussion of Fig. 7.

What is claimed is:

1. An adjustable equalizer having a peak of insertion loss which may be adjusted while maintaining a substantially zero loss at a selected frequency comprising a pair of input terminals, a pair of output terminals, and a branch connected at one end to one of said input terminals and one of said output terminals and at its other end to the other two of said terminals, said branch including the series combination of an adjustable resistor, an inductor, and an impedance comprising a piezoelectric crystal which is parallel resonant approximately at said frequency.

2. An equalizer in accordance with claim 1 in which said inductor is adjustable.

3. An equalizer in accordance with claim 1 in which said impedance includes an adjustable capacitor connected in parallel with said crystal.

4. An equalizer in accordance with claim 3 in which said inductor is adjustable.

5. An adjustable equalizer of the bridged-T type having a peak of insertion loss which may be adjusted while maintaining a substantially zero loss at a selected frequency comprising two resistors each of value $R_0$ connected in series, a bridging branch of impedance $Z_1$ connected between the outer terminals of said resistors, and a shunt branch of impedance $Z_2$ connected to the common terminal of said resistors, the product of $Z_1$ and $Z_2$ being equal to $R_0^2$, said bridging branch including the parallel combination of a first piezoelectric crystal which is series resonant at said frequency, a third adjustable resistor, an inductor of value $L_1$, and an adjustable capacitor, said shunt branch including the series combination of a fourth adjustable resistor, a second capacitor of value $C_4$, a second adjustable inductor, and an impedance comprising a third capacitor of value $C_2$ in parallel with a second piezoelectric crystal which is identical with said first crystal, and said first crystal having an equivalent circuit comprising a capacitance $C_0$ shunted by the series combination of an inductance $L_x$ and a capacitance $C_x$, wherein $$C_2=\sqrt{\frac{L_xC_x}{R_0}}-C_0$$

$$C_4=\frac{L_1}{R_0^2\left[1-\frac{L_1}{L_x}\left(\sqrt{\frac{L_x}{R_0^2C_x}}-1\right)\right]}$$

References Cited in the file of this patent

UNITED STATES PATENTS

| | | |
|---|---|---|
| 1,509,184 | Zobel | Sept. 23, 1924 |
| 1,603,305 | Zobel | Oct. 19, 1926 |
| 1,606,817 | Stevenson | Nov. 16, 1926 |
| 1,967,250 | Mason | July 24, 1934 |
| 2,019,624 | Norton | Nov. 5, 1935 |
| 2,045,991 | Mason | June 30, 1936 |
| 2,096,027 | Bode | Oct. 19, 1937 |
| 2,153,743 | Darlington | Apr. 11, 1939 |
| 2,198,684 | Sykes | Apr. 30, 1940 |
| 2,222,043 | Oram | Nov. 19, 1940 |
| 2,265,042 | Lundry | Dec. 2, 1941 |
| 2,337,399 | Mason | Dec. 21, 1943 |
| 2,637,779 | Craiglow | May 5, 1953 |

FOREIGN PATENTS

| | | |
|---|---|---|
| 509,141 | Great Britain | July 10, 1939 |